United States Patent
Lee et al.

(10) Patent No.: US 7,983,134 B2
(45) Date of Patent: Jul. 19, 2011

(54) METHOD AND APPARATUS FOR RECORDING/REPRODUCING DATA ON/FROM A RECORDING MEDIUM

(75) Inventors: Je Jong Lee, Seoul (KR); Hyung Jun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 12/379,087

(22) Filed: Feb. 12, 2009

(65) Prior Publication Data

US 2009/0213716 A1 Aug. 27, 2009

(30) Foreign Application Priority Data

Feb. 21, 2008 (KR) .......................... 10-2008-0015759

(51) Int. Cl.
*G11B 7/135* (2006.01)
*G11B 7/00* (2006.01)

(52) U.S. Cl. ................. 369/112.12; 369/120; 369/44.41

(58) Field of Classification Search ............. 369/112.03, 369/112.07, 112.04, 112.12, 44.23
See application file for complete search history.

(56) References Cited

U.S. PATENT DOCUMENTS

2007/0189130 A1* 8/2007 Anzai et al. ................. 369/44.23
2009/0028035 A1* 1/2009 Sano et al. ................ 369/112.03

FOREIGN PATENT DOCUMENTS

WO WO 2006118082 A1 * 11/2006
* cited by examiner

*Primary Examiner* — Joseph Haley
*Assistant Examiner* — Nicholas Lee
(74) *Attorney, Agent, or Firm* — Harness, Dickey & Pierce

(57) ABSTRACT

A method and apparatus for recording/reproducing data is disclosed. The apparatus for recording/reproducing data comprises a diffraction element splitting light diffracted or reflected from a recording medium into a main beam and first and second sub beams, the main beam and the first and second sub beams having no interference from one another; a light-receiving part detecting the main beam and the first and second sub beams; and a controller controlling a position of the diffraction element based on at least one light capacity of the detected beams or the detected position.

9 Claims, 6 Drawing Sheets

SPP=K(Z1−Z2)

METHOD AND APPARATUS FOR RECORDING/REPRODUCING DATA ON/FROM A RECORDING MEDIUM

This application claims the benefit of the Korean Patent Application No. 10-2008-0015759, filed on Feb. 21, 2008, which is hereby incorporated by reference as if fully set forth herein.

BACKGROUND OF THE INVENTION

1. Field of the Invention

The present invention relates to recording/reproducing, and more particularly, to a method and apparatus for generating/detecting a stable and exact tracking error signal.

2. Discussion of the Related Art

With the increase of recording capacity, recording media that can record large-scaled data, such as CD, DVD, and a high-density recording medium (for example, HD-DVD and BD), have been continuously developed, wherein the high-density recording medium recently developed can record and store video data of high picture quality and audio data of high sound quality for a long time. Also, these recording media are being developed as recording media that are more convenient and useful, in accordance with improvement of recording/reproducing speed as well as the increase of recording capacity.

Generally, the recording medium is divided into a lead-in area, a data area, and a lead-out area. These areas may be used as other terminologies in accordance with types and use of the receiving medium, and may additionally be provided with a specific area such as additional information or test area. However, most of the recording media have the aforementioned three areas.

Furthermore, a track is formed in a recording layer of the recording medium. Since data are recorded along the track, it is necessarily required for a pickup of a recording/reproducing apparatus to exactly trace the track to record or reproduce the data. To this end, the recording/reproducing apparatus detects a tracking error signal and controls the position of the pickup based on the tracking error signal. Generally, the conventional recording/reproducing apparatus obtains the tracking error signal using one main beam and two sub beams. In this case, the two sub beams are to compensate an error generated by motion of the main beam, wherein the motion of the main beam is caused by motion of the pickup. The two sub beams are generated by a diffractive device located in front of a light source. Namely, as the main beam is diffracted by the diffractive device, the two sub beams are generated. After the main beam and the two sub beams are reflected by the recording medium, they are detected by a light-receiving device of the recording/reproducing apparatus.

However, it is difficult to generate/detect stable and exact sub beams due to an inner error (aberration) of the recording/reproducing apparatus in generating/detecting the two sub beams. Accordingly, the positions of the diffractive device and the light-receiving device should be adjusted to stably and exactly generate/detect the sub beams. However, since the beams formed in the light-receiving device are very small and the position of the light-receiving device is performed in conjunction with the position of the diffractive device, control in the position of the light-device device is not easy and its exactness is not high. Accordingly, there is limitation in obtaining the exact tracking error signal.

SUMMARY OF THE INVENTION

Accordingly, the present invention is directed to a method and apparatus for recording/reproducing data on/from a recording medium, which substantially obviate ones or more problems due to limitations and disadvantages of the related art.

An object of the present invention is to provide a method and apparatus for recording/reproducing data on/from a recording medium, in which a reliable tracking error signal is detected.

Another object of the present invention is to provide a method and apparatus for recording/reproducing data on/from a recording medium, in which sub beams are generated/detected through simple control.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for recording/reproducing data comprises splitting light diffracted or reflected from a recording medium into a main beam and first and second sub beams using a diffraction element, the main beam and the first and second sub beams having no interference from one another; detecting the main beam and the first and second sub beams; and controlling a position of the diffraction element based on at least one light capacity of the detected beams or the detected position.

In the step of splitting light into a main beam and first and second sub beams, the main beam is not diffracted, and the first and second sub beams are diffracted in different directions based on the main beam. In this case, the first sub beam is diffracted by diffraction grating located on an upper part and/or a lower part of a left side of the diffraction element, and the second sub beam is diffracted by diffraction grating located on an upper part and/or a lower part of a right side of the diffraction element. Also, the first sub beam is diffracted by diffraction grating located on an upper part of a left side of the diffraction element and a lower part of a right side of the diffraction element, and the second sub beam is diffracted by diffraction grating located on a lower part of a left side of the diffraction element and an upper part of a right side of the diffraction element.

In the step of controlling a position of the diffraction element includes controlling the position of the diffraction element based on light capacities of the first and second sub beams diffracted by the diffraction element so that the light capacities of the first and second sub beams become equal to each other.

In another aspect of the present invention, an apparatus for recording/reproducing data comprises a diffraction element splitting light diffracted or reflected from a recording medium into a main beam and first and second sub beams, the main beam and the first and second sub beams having no interference from one another; a light-receiving part detecting the main beam and the first and second sub beams; and a controller controlling a position of the diffraction element based on at least one light capacity of the detected beams or the detected position.

The diffraction element includes a first diffractive grating region located on an upper part and/or a lower part of a left side, and a second diffractive grating region located on an upper part and/or a lower part of a right side. In this case, the controller controls the position of the diffraction element in left and right directions based on difference between light capacities of the first and second sub beams diffracted by the diffraction element.

The diffraction element includes a first diffractive grating region located on an upper part of a left side and a lower part of a right side, and a second diffractive grating region located on a lower part of a left side and an upper part of a right side. In this case, the controller controls the position of the diffraction element in left and right directions based on difference between light capacity of the first sub beam diffracted by the first diffractive grating region on the upper part of the left side and light capacity of the second sub beam diffracted by the second diffractive grating region on the upper part of the right side, or controls the position of the diffraction element in left and right directions based on difference between light capacity of the first sub beam diffracted by the first diffractive grating region on the lower part of the right side and light capacity of the second sub beam diffracted by the second diffractive grating region on the lower part of the left side.

The light-receiving part includes two single type light-receiving elements or two two-split light-receiving elements respectively detecting the first and second sub beams diffracted by the diffraction element, and four-split light-receiving elements detecting the main beam which is not diffracted.

As described above, since the sub beams are controlled by controlling the position of the diffraction element without controlling the light-receiving element (photodiode), it is simple and easy to exactly control the sub beams. In particular, since decoupling components (DC region) of the sub beams are selected/extracted by only controlling the position of the diffraction element and at the same time the light capacities of the sub beams are controlled, it is possible to stably and exactly a tracking error signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms, in special case, the terms mentioned in the description of the present invention have been selected by the applicant at his or her discretion, the detailed meanings of which are described in relevant parts of the description herein. Accordingly, the terms used herein should be understood not simply by the actual terms used but by the meaning lying within and the description disclosed herein.

In this respect, "recording medium" used in the present invention is a general term of all recordable media. For example, the "recording medium" means an optical disk such as CD, DVD, HD-DVD (high density-digital versatile disk), BD (blu-ray disk), near-field recording medium, and other type recording medium such as magnetic disk and magnetic tape. Hereinafter, for convenience of description in the present invention, an example of an optical disk will be described.

Hereinafter, the preferred embodiments of the present invention will be described in detail with reference to the accompanying drawings.

First Embodiment

Figure 1:
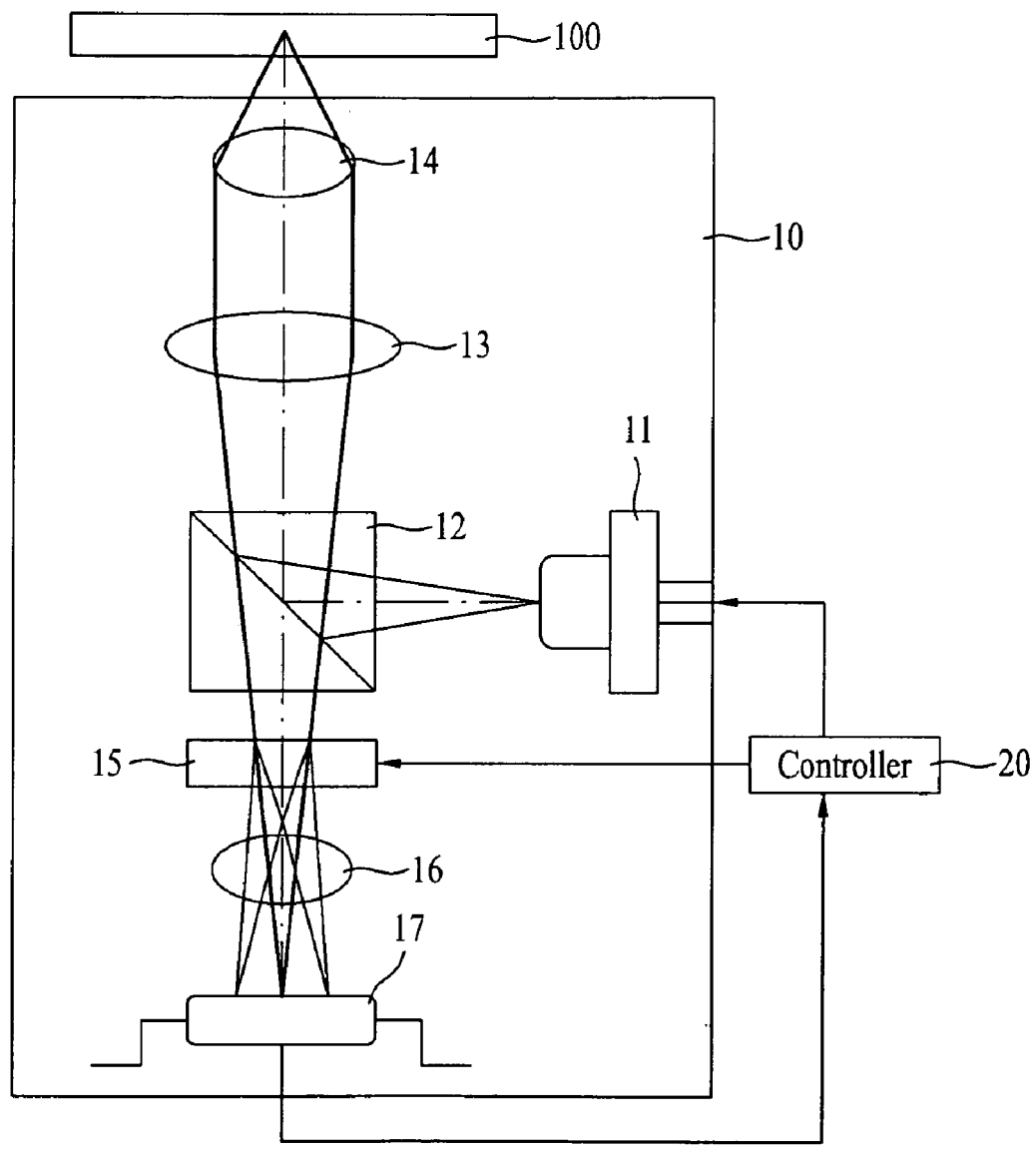
FIG. 1 briefly illustrates an example of an apparatus for recording/reproducing data in accordance with the present invention.

FIG. 1 briefly illustrates an apparatus for recording/reproducing data in accordance with the first embodiment of the present invention. FIG. 1 illustrates only elements required to describe the technical gist of the present invention by omitting general elements. As illustrated in FIG. 1, the apparatus for recording/reproducing data according to the present invention comprises a light source part 11, a beam splitter 12, a collimation lens 13, an object lens 14, a diffractive device 15, a sensor lens 16, a light-receiving part 17, and a controller 20. The light source part 11, the beam splitter 12, the collimation lens 13, the object lens 14, the diffractive device 15, the sensor lens 16, and the light-receiving part 17 are included within a pickup 10.

The light source part 11 includes a gas laser, a solid laser, a semiconductor laser, or a semiconductor diode, which generates light having high interference, for example, laser beams. The beam splitter 12 reflects a part of the light output from the light source part 11 toward a recording medium 100 and transmits the other part of the light. The beam splitter 12 also has a beam splitting function. The collimation lens 13 gathers the light provided through the beam splitter 12 so as not to disperse the light provided through the beam splitter 12. The object lens 14 enters the light, which has passed through the collimation lens 13, in the recording medium 100.

The light entered in the recording medium 100 is reflected or diffracted by the recording medium 100. Although FIG. 1 illustrates a path of the light reflected by the recording medium 100, the present invention can be applied to the light transmitted or diffracted by the recording medium 100 as well as the light reflected by the recording medium 100. The light reflected by the recording medium 100 can be provided to the diffractive device 15 through the object lens 14, the collimation lens 13, and the beam splitter 12. The light transmitted or diffracted by the recording medium 100 can be transferred to the diffractive device 15 through another path. The diffractive device 15 can be called as a diffraction element.

Figure 2:
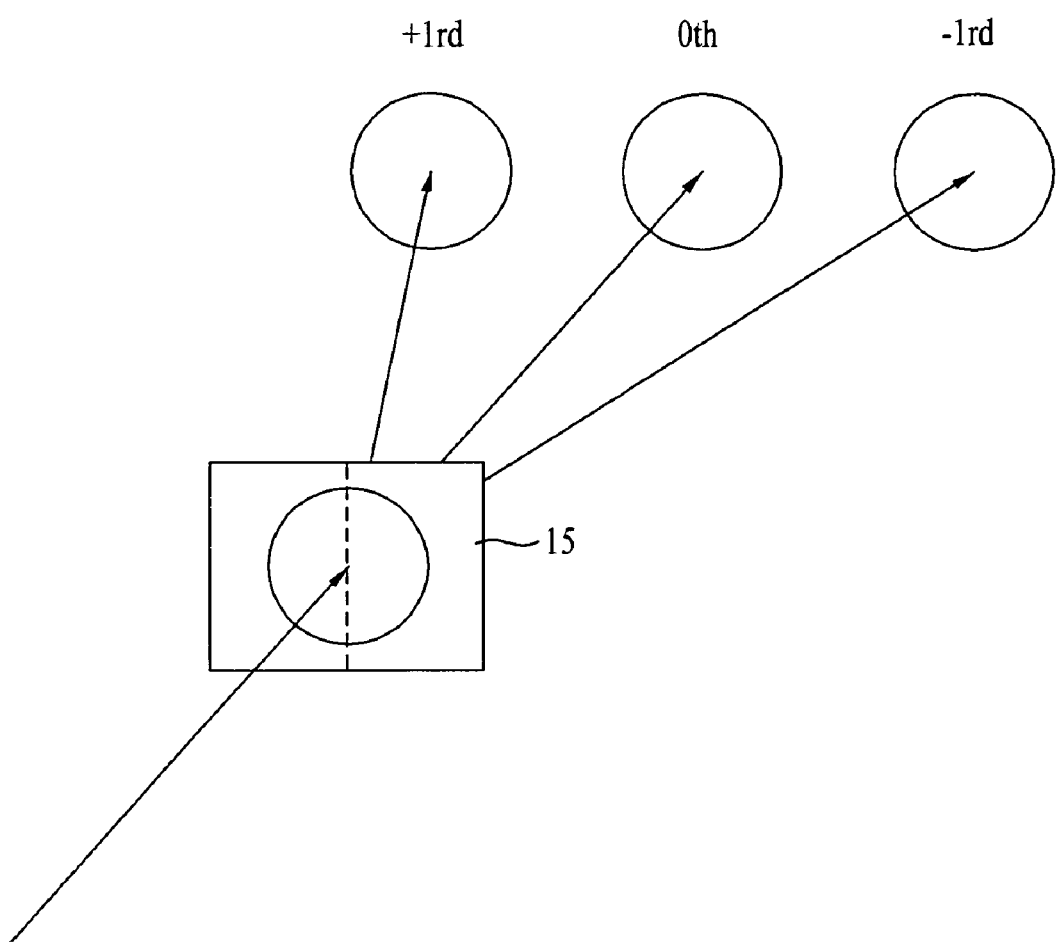
FIG. 2, FIG. 3A, and FIG. 3B briefly illustrate a diffractive device according to the present invention.
Figure 3A:
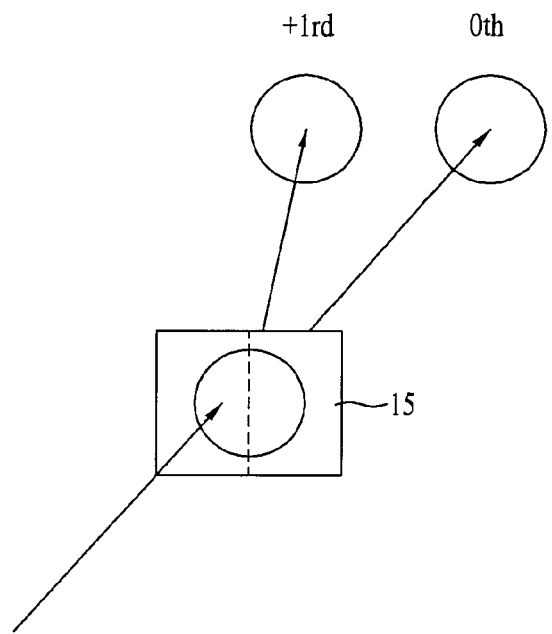
Figure 3B:
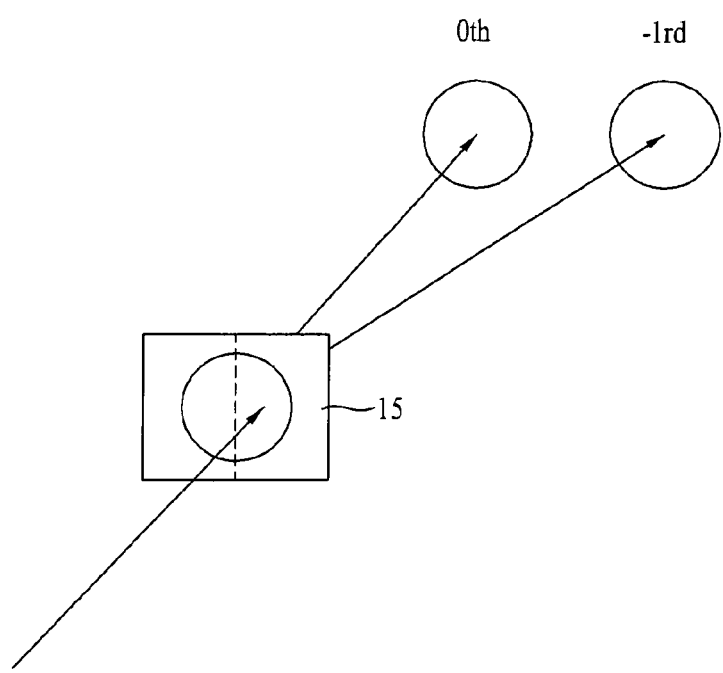

FIG. 2, FIG. 3A and FIG. 3B briefly illustrate the diffractive device 15. As illustrated in FIG. 2, the diffractive device 15 splits the light transferred from the recording medium 100 into a main beam ($0^{th}$) and first and second sub beams (+1rd and −1rd) using gratings. In this case, the main beam ($0^{th}$) is generated as the light transferred from the recording medium 100 passes through the diffractive device 15. The first and second sub beams (+1rd and −1rd) are generated as the light transferred from the recording medium 100 is diffracted at different angles by the diffractive device 15. For example, the first sub beam (+1rd) is diffracted at a certain angle toward the left based on the main beam ($0^{th}$), and the second sub beam (−1rd) is diffracted at a certain angle toward the right based on the main beam ($0^{th}$). A beam splitting ratio among the main beam, the first sub beam and the second sub beam is set to n:1:1. As illustrated in FIG. 3A and FIG. 3B, the diffractive device 15 can be divided into a left side part (first diffractive part) and a right side part (second diffractive part), wherein the left side part outputs the main beam ($0^{th}$) and the first sub beam (+1rd), and the right side part outputs the main beam ($0^{th}$) and the second sub beam (−1rd). Also, the intensity of the first and second sub beams (+1rd and −1rd) can be adjusted selectively by design modification of the left side part and the right side part of the diffractive device 15. For example, the intensity of the first sub beam (+1rd) can be adjusted to be greater than the intensity of the second sub beam (−1rd). By contrast, the intensity of the second sub beam (−1rd) can be adjusted to be greater than the intensity of the first sub beam (+1rd). Since the intensity of the first and second sub beams (+1rd and −1rd) can be adjusted selectively, the intensity of the first sub beam can be adjusted to be equal to the intensity of the second sub beam.

Figure 4:
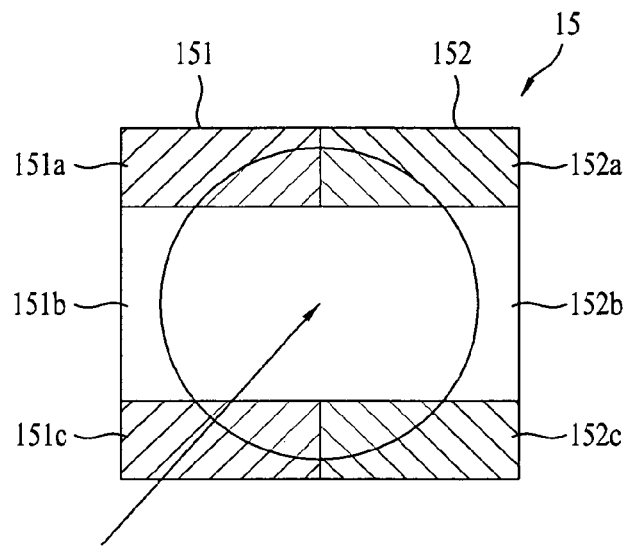
FIG. 4 illustrates an example of a diffractive device according to the present invention.

FIG. 4 illustrates an example of the diffractive device 15 in detail. As illustrated in FIG. 4, the diffractive device 15 is divided into a left side part 151 and a right side part 152. First and second grating regions 151a and 151c are respectively arranged on upper and lower parts of the left side part 151, and a non-grating region 151b is arranged between the first and second grating regions 151a and 151c. In this case, the first and second grating regions 151a and 151c emit the main beam ($0^{th}$) and the first sub beam (+1rd), and the non-grating region 151b emits the main beam ($0^{th}$) only. Likewise, first and second grating regions 152a and 152c are respectively arranged on upper and lower parts of the right part 152, and a non-grating region 152b is arranged between the first and second grating regions 152a and 152c. In this case, the first and second grating regions 152a and 152c emit the main beam ($0^{th}$) and the second sub beam (−1rd), and the non-grating region 152b emits the main beam ($0^{th}$) only. The grating regions 151a and 151c of the left side part 151 and the grating regions 152a and 152c of the right side part 152 generate their respective sub beams at a diffractive angle/intensity in accordance with a grating type and a grating tilt.

Figure 5:
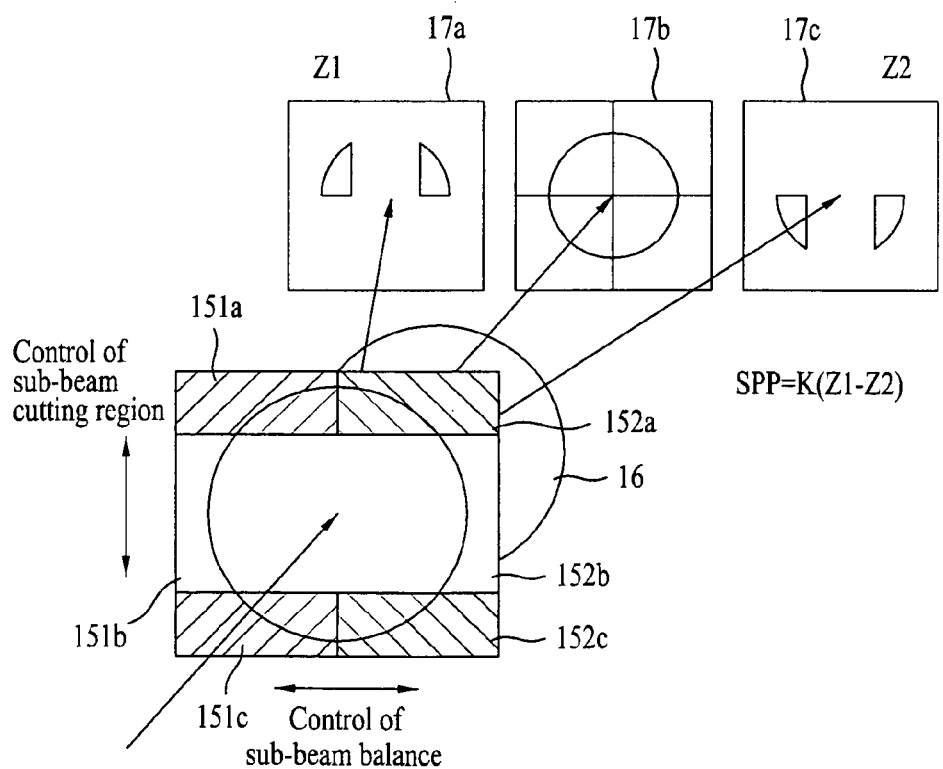
FIG. 5 illustrates a diffractive device, a sensor lens, and a light-receiving part according to the first embodiment of the present invention.

FIG. 5 illustrates the diffractive device 15, the sensor lens 16, and the light-receiving part 17 in detail. The sensor lens 16 rotates the main beam ($0^{th}$) and the first and second sub beams (+1rd and −1rd) output through the diffractive device 15 at an angle of 90 clockwise and forms a focus on the light-receiving part 17. The light-receiving part 17 includes three light-receiving devices for respectively detecting the light capacity and/or light-receiving position of the main beam ($0^{th}$) and the first and second sub beams (+1rd and −1rd). Although each of the first and third light-receiving devices 17a and 17c respectively receiving the first and second sub beams may include two-split or four-split photodiodes, it may include a single photodiode to exactly detect the first and second sub beams. Also, the second light-receiving device 17b receiving the main beam ($0^{th}$) preferably includes four-split photodiodes. Although FIG. 5 illustrates the first and third light-receiving devices 17a and 17c of a single photodiode and the second light-receiving device of four-split photodiodes, it will be apparent that modification can be made in the configuration of the first, second and third light-receiving devices 17a, 17b and 17c. The first, second and third light-receiving devices 17a, 17b and 17c convert the detected light into electrical signals and provide them to the controller 20.

The controller 20 performs control steps of moving the diffractive device 15 up and down to select/extract DC components having no interference from the first and second sub beams and moving the diffractive device 15 in left and right directions to make the light capacity of the first sub beam (+1rd) equal to the light capacity of the second sub beam (−1rd). Also, the controller 20 obtains a tracking error signal from the signals provided from the first, second and third light-receiving devices 17a, 17b and 17c and control the position of the pickup using the tracking error signal so that the pickup traces the track. The control steps of selecting/extracting the DC components and controlling the light capacities of the first and second sub beams will be described later in more detail.

Although not shown, it will be apparent that the apparatus for recording/reproducing data further comprises a control means moving the diffractive device 15 in left and right directions or up and down in accordance with a command of the controller 20. Also, it will be apparent that the apparatus for recording/reproducing data can further comprise an image sensor (not shown) which includes a semiconductor pickup device such as a charge-coupled device to reproduce the data.

An example of a method for detecting a tracking error signal using the apparatus for recording/reproducing data according to the present invention will be described below.

Generally, the tracking error signal is used to record or reproduce the data in the recording medium 100. In particular, the tracking error signal is required to trace the track after the pickup 10 or the object lens 14 move to a radius direction of the recording medium. It will be apparent that the method for detecting a tracking error signal according to the present invention can be applied to all cases where the tracking error signal is required, as well as data recording/reproducing steps.

First of all, if the light source 11 outputs light to the recording medium 100 and the light reflected or diffracted by the recording medium 100 is transferred to the diffractive device 15, the diffractive device 15 splits the light into the main beam ($0^{th}$) and the first and second sub beams (+1rd and −1rd) as aforementioned.

Figure 6:
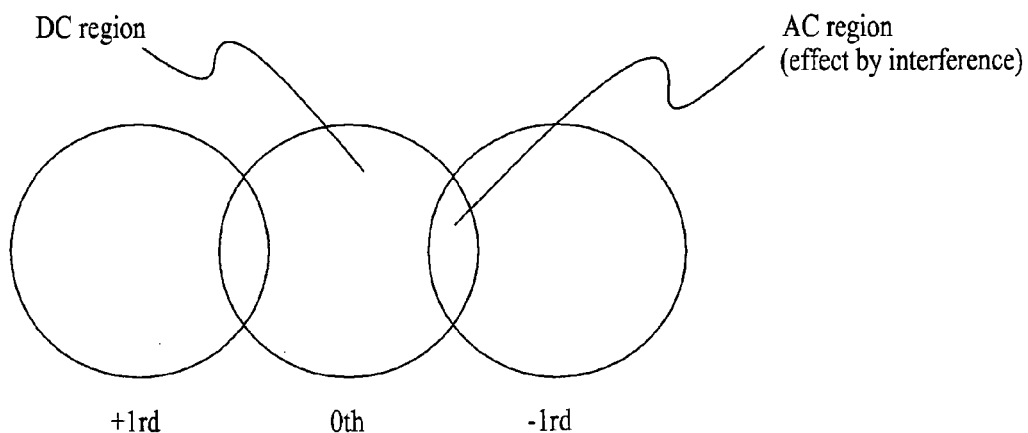
FIG. 6 illustrates an interference region and a decoupling region of a main beam and two sub beams.

As illustrated in FIG. 6, since three beams output from the diffractive device 15 are adjacent to one another, interference is caused. The interference component will be referred to as AC component. Also, a component having no interference will be referred to as DC component.

In order to extract only the DC component from the first and second sub beams (+1rd and −1rd), the first sub beam (+1rd) is output through only the first and second grating regions 151a and 151c located at the left side part 151 of the diffractive device 15, and the second sub beam (−1rd) is output though only the first and second grating regions 152a and 152c located at the right side part 152 of the diffractive device 15. In other words, the first sub beam is output in such a manner that the right component adjacent to the main beam is excluded from the first sub beam. The second sub beam is output in such a manner that the left component adjacent to the main beam is excluded from the second sub beam. The sensor lens 16 rotates the main beam and the first and second sub beams at an angle of 90 clockwise to transfer the beams to the light-receiving part 17.

At this time, the controller 20 moves the diffractive device 15 up and down (control of sub-beam cutting region) so that the diffractive device 15 reaches a predetermined position to select the DC components of the first and second sub beams (to determine position/size of the detected DC components).

Alternatively, the controller 20 moves the position of the diffractive device 15 up and down so that the two DC components detected from the first light-receiving device 17*a* become equal to each other, or moves the position of the diffractive device 15 up and down so that the two DC components detected from the third light-receiving device 17*c*. In this case, it is preferable that the first light-receiving device 17*a* or the third light-receiving device 17*c* is comprised of two-split photodiodes.

Furthermore, the controller 20 moves the diffractive device 15 in left and right directions (balance control of sub-beams) based on the signal Z1 detected from the first light-receiving device 17*a* and the signal Z2 detected from the third light-receiving device 17*c* so that the light capacity of the first sub beam becomes equal to that of the second sub beam. For example, the controller 20 moves the position of the diffractive device 15 in left and right directions so that the two signals Z1 and Z2 respectively detected from the first and third light-receiving devices 17*a* and 17*c* have the same size as each other.

If up and down/left and right motion of the diffractive device 15 is completed, the controller 20 generates a sub beam push-pull (SPP) signal using values of the two signals Z1 and Z2 detected from the first and third light-receiving devices 17*a* and 17*c*. For example, the sub beam push-pull signal can be obtained by substituting the values of the two signals for a predetermined operation equation, SPP=K(Z1−Z2) (where K is a random constant). At the same time, the controller 20 generates a main push-pull (MPP) signal detected from the second light-receiving device 17*b*. Also, the controller 20 generates a tracking error signal using the sub beam push-pull (SPP) signal and the main beam push-pull (MPP) signal. It will be apparent to those skilled in the art that the tracking error signal is generated using the sub beam push-pull (SPP) signal and the main beam push-pull (MPP) signal. Accordingly, its detailed description will be omitted.

As described above, sub beam control through position control of the diffractive device 15 is more stably performed than sub beam control through position control of the light-receiving device 17, i.e., photodiode. This is because that a size (sectional area) of the beam passing through the diffractive device 15 is greater than a focus formed on the light-receiving device 17 and beam control of greater size is more exact than that of smaller size. Also, if a fine change in the position of the elements of the apparatus for recording/reproducing data occurs even after the sub beam is controlled, since the sub beam can be controlled again, a stable tracking error signal can be obtained.

Second Embodiment

Figure 7:
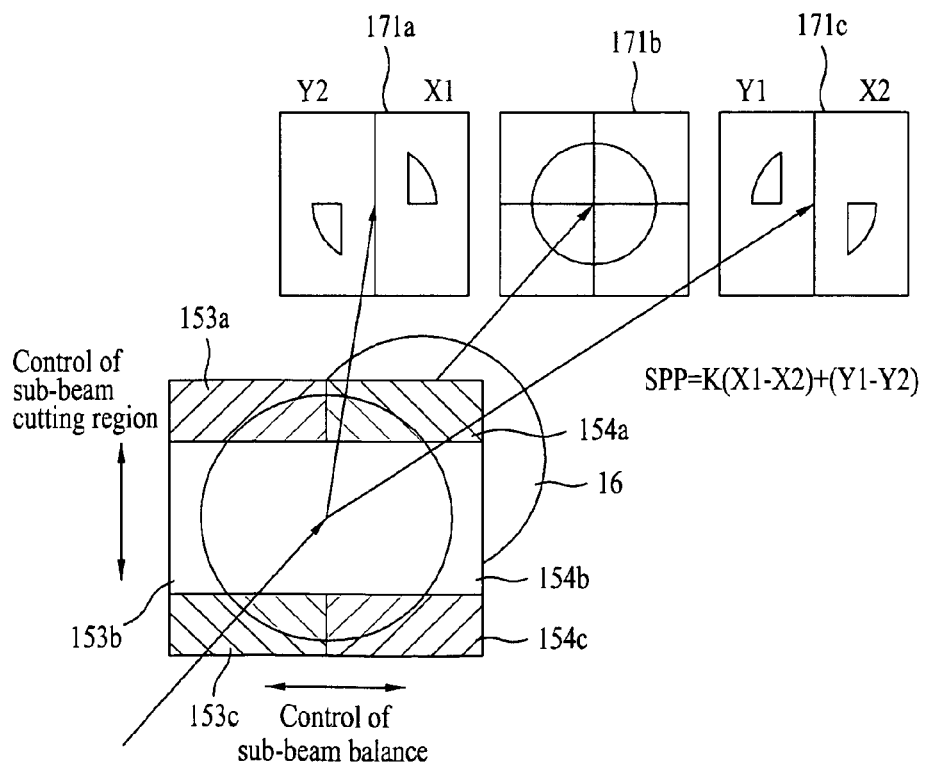
FIG. 7 illustrates a diffractive device, a sensor lens, and a light-receiving part according to the second embodiment of the present invention.

FIG. 7 illustrates a part of an apparatus for recording/reproducing data in accordance with the second embodiment of the present invention. Since the second embodiment of the present invention has the same elements as those of the first embodiment except for a diffractive device, a light-receiving device, and a controller, the second embodiment will be described based on the diffractive device, the light-receiving device and the controller.

As illustrated in FIG. 7, the diffractive device 15 is divided into a left side part 153 and a right side part 154. First and second grating regions 153*a* and 153*c* are respectively arranged on upper and lower parts of the left side part 153, and a non-grating region 153*b* is arranged between the first and second grating regions 153*a* and 153*c*. Likewise, first and second grating regions 154*a* and 154*c* are respectively arranged on upper and lower parts of the right part 154, and a non-grating region 154*b* is arranged between the first and second grating regions 154*a* and 154*c*. In this case, the first grating region 153*a* of the left side part 153 and the second grating region 154*c* of the right side part 154 emit the main beam ($0^{th}$) and the first sub beam (+1rd), and the first grating region 154*a* of the right side part 154 and the second grating region 153*c* of the left side part 153 emit the main beam ($0^{th}$) and the second sub beam (−1rd). The non-grating regions 153*b* and 154*b* emit the main beam ($0^{th}$) only.

The sensor lens 16 rotates the main beam ($0^{th}$) and the first and second sub beams (+1rd and −1rd) output through the diffractive device 15 at an angle of 90 clockwise and then transfers the beams to the light-receiving part 17. The light-receiving part 17 includes three light-receiving devices for respectively detecting the main beam ($0^{th}$) and the first and second sub beams (+1rd and −1rd). Each of the first and third light-receiving devices 171*a* and 171*c* simultaneously receiving the first and second sub beams may include two-split or four-split photodiodes. However, since each of the first and third light-receiving devices 171*a* and 171*c* simultaneously receives the first and second sub beams in a diagonal direction as illustrated in FIG. 7, it may include two-split photodiodes to exactly detect the first and second sub beams.

The first sub beam (+1rd) is output through only the two grating regions 153*a* and 154*c* located in a diagonal direction of the diffractive device 15, and the second sub beam (−1rd) is output through only the two grating regions 154*a* and 153*c* located in a diagonal direction of the diffractive device 15. Even though the first and second sub beams are simultaneously output through the left side part and the right side part of the diffractive device 15, since a part of the right component of the first sub beam adjacent to the main beam and a part of the left component of the second sub beam are excluded from the output sub beams, the first and second sub beams do not include AC component.

At this time, in order to select only the DC components of the first and second sub beams, the controller 20 moves the diffractive device 15 up and down based on a component X1 of the first sub beam detected from the first light-receiving device 171*a* and a component Y1 of the second sub beam detected from the third light-receiving device 171*c*, or moves the diffractive device 15 up and down based on a component Y2 of the first sub beam detected from the first light-receiving device 171*a* and a component X2 of the second sub beam detected from the third light-receiving device 171*c*. For example, the controller 20 compares sizes of the two components X1 and Y1 with each other, and moves the position of the diffractive device 15 up and down so that the sizes of the two components X1 and Y1 become equal to each other.

Furthermore, the controller 20 moves the diffractive device 15 in left and right directions based on the difference between the two components X1 and X2 or the difference between another two components Y1 and Y2 so that the first and second sub beams have the same beam capacity.

If up and down or left and right motion of the diffractive device 15 is completed, the controller 20 generates a sub beam push-pull (SPP) signal using the four component values X1, X2, Y1 and Y2 detected from the first and third light-receiving devices 171*a* and 171*c*. For example, the sub beam push-pull signal can be obtained by substituting the four component values for a predetermined operation equation, SPP=K(X1−X2)+(Y1−Y2) (where K is a random constant). At the same time, the controller 20 generates a main push-pull (MPP) signal detected from the second light-receiving device 171b. Also, the controller 20 generates a tracking error signal using the sub beam push-pull (SPP) signal and the main beam push-pull (MPP) signal.

Third Embodiment

Figure 8:
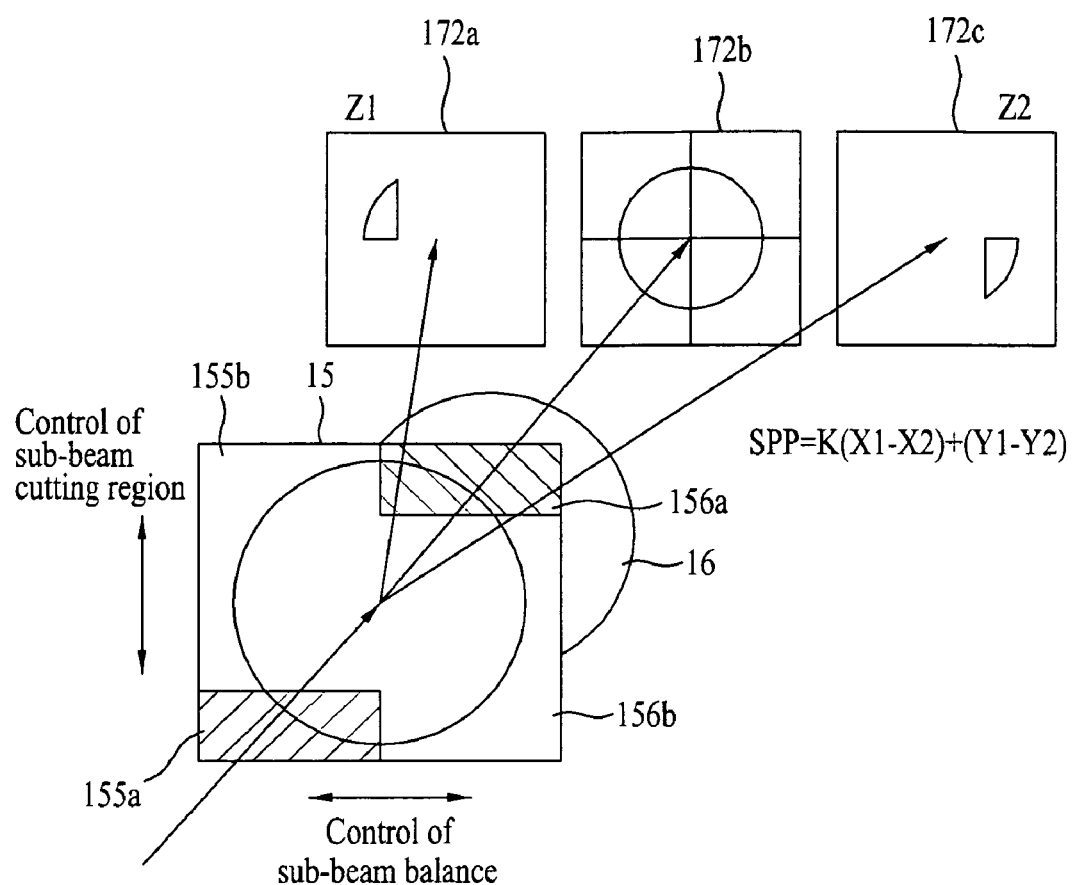
FIG. 8 illustrates a diffractive device, a sensor lens, and a light-receiving part according to the second embodiment of the present invention.

FIG. 8 illustrates a part of an apparatus for recording/reproducing data in accordance with the third embodiment of the present invention. Since the third embodiment of the present invention has the same elements as those of the first embodiment except for a diffractive device, a light-receiving device, and a controller, the third embodiment will be described based on the diffractive device, the light-receiving device and the controller.

As illustrated in FIG. 8, the diffractive device 15 is divided into a left side part and a right side part. A grating region 155a is arranged on a lower part of the left side part, and a non-grating region 155b is arranged above the grating region 155a. Likewise, a grating region 156a is arranged on an upper part of the right side part, and a non-grating region 156b is arranged below the grating region 156a. By contrast, the grating region 155a may be arranged on the upper part of the left side part, and the grating region 156a may be arranged on the lower part of the right side part. In this case, the grating region 155a of the left side part emits the main beam ($0^{th}$) and the first sub beam (+1rd), and the grating region 156a of the right side part emits the main beam ($0^{th}$) and the second sub beam (−1rd). The non-grating regions 155b and 156b emit the main beam ($0^{th}$) only.

The sensor lens 16 rotates the main beam ($0^{th}$) and the first and second sub beams (+1rd and −1rd) output through the diffractive device 15 at an angle of 90 clockwise and then transfers the beams to the light-receiving part 17. The light-receiving part 17 includes three light-receiving devices for respectively detecting the main beam ($0^{th}$) and the first and second sub beams (+1rd and −1rd). Although each of the first and third light-receiving devices 171a and 171c respectively receiving the first and second sub beams may include two-split or four-split photodiodes, it may include a singe photodiode to exactly detect the first and second sub beams. Also, the second light-receiving device 172b receiving the main beam ($0^{th}$) preferably includes four-split photodiodes. Although FIG. 8 illustrates the first and third light-receiving devices 172a and 172c of a single photodiode and the second light-receiving device 172b of four-split photodiodes, it will be apparent that modification can be made in the configuration of the first, second and third light-receiving devices 172a, 172b and 172c. The first, second and third light-receiving devices 172a, 172b and 172c convert the detected beams into electrical signals and provide them to the controller 20.

In order to select DC components of the first and second sub beams, the controller 20 moves the diffractive device 15 up and down so that the diffractive device reaches a predetermined position (control of sub-beam cutting region).

Also, the controller 20 compares the detected two light capacities Z1 and Z2, and moves the diffractive device 15 in left and right directions so that the light capacities Z1 and Z2 of the first and second sub beams become equal to each other.

If up and down or left and right motion of the diffractive device 15 is completed, the controller 20 generates a sub beam push-pull (SPP) signal using the detected two component values Z1 and Z2 detected from the first and third light-receiving devices 172a and 172c. For example, the sub beam push-pull signal can be obtained by substituting the two component values for a predetermined operation equation, SPP=K(Z1−Z2) (where K is a random constant). At the same time, the controller 20 generates a main push-pull (MPP) signal detected from the second light-receiving device 172b. Also, the controller 20 generates a tracking error signal using the sub beam push-pull (SPP) signal and the main beam push-pull (MPP) signal.

Although the three embodiments have been respectively described in the present invention, it will be apparent that modifications and combinations can be made in the apparatuses for recording/reproducing data the methods for detecting a tracking error signal in accordance with the respective embodiments. Namely, it will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for recording/reproducing data, the method comprising:
   splitting light diffracted or reflected from a recording medium into a main beam and first and second sub beams using a diffraction element, the main beam and the first and second sub beams having no interference from each other, the main beam not being diffracted, and the first and second sub beams being diffracted into different directions from each other based on the main beam;
   detecting the main beam and the first and second sub beams; and
   controlling a position of the diffraction element based on at least one of a detected position and light capacity of the detected beams,
   wherein the first sub beam is diffracted by diffraction grating located on an upper part of a left side of the diffraction element and a lower part of a right side of the diffraction element, and the second sub beam is diffracted by diffraction grating located on a lower part of the left side of the diffraction element and an upper part of the right side of the diffraction element.

2. The method as claimed in claim 1, wherein in the step of detecting the main beam and the first and second sub beams, the first and second sub beams diffracted by the diffraction element are respectively detected using two single type light-receiving elements or two two-split light-receiving elements, and the main beam not diffracted is detected using four-split light-receiving elements.

3. The method as claimed in claim 1, wherein the step of controlling a position of the diffraction element includes controlling the position of the diffraction element based on light capacities of the first and second sub beams diffracted by the diffraction element.

4. The method as claimed in claim 3, wherein the position of the diffraction element is controlled so that the light capacities of the first and second sub beams become equal to each other.

5. An apparatus for recording/reproducing data, the apparatus comprising:
   a diffraction element splitting light diffracted or reflected from a recording medium into a main beam and first and second sub beams, the main beam and the first and second sub beams having no interference from each other, the main beam not being diffracted, and the first and second sub beams being diffracted into different directions from each other based on the main beam;

a light-receiving part detecting the main beam and the first and second sub beams; and a controller controlling a position of the diffraction element based on at least one of a detected position and light capacity of the detected beams, wherein the diffraction element includes a first diffraction grating region located on an upper part of a left side and a lower part of a right side, and a second diffraction grating region located on a lower part of the left side and an upper part of the right side.

6. The apparatus as claimed in claim 5, wherein the light-receiving part includes two single type light-receiving elements or two two-split light-receiving elements respectively detecting the first and second sub beams diffracted by the diffraction element, and four-split light-receiving elements detecting the main beam which is not diffracted.

7. The apparatus as claimed in claim 5, wherein the controller controls the position of the diffraction element in left and right directions based on difference between light capacities of the first and second sub beams diffracted by the diffraction element.

8. The apparatus as claimed in claim 5, wherein the controller controls the position of the diffraction element in left and right directions based on difference between light capacity of the first sub beam diffracted by the first diffractive grating region on the upper part of the left side and light capacity of the second sub beam diffracted by the second diffraction grating region on the upper part of the right side.

9. The apparatus as claimed in claim 5, wherein the controller controls the position of the diffraction element in left and right directions based on difference between light capacity of the first sub beam diffracted by the first diffraction grating region on the lower part of the right side and light capacity of the second sub beam diffracted by the second diffraction grating region on the lower part of the left side.

* * * * *